(12) United States Patent
Ying

(10) Patent No.: US 9,830,310 B2
(45) Date of Patent: *Nov. 28, 2017

(54) SELECTION OF PAGE TEMPLATES FOR PRESENTING DIGITAL MAGAZINE CONTENT BASED ON CHARACTERISTICS OF ADDITIONAL PAGE TEMPLATES

(71) Applicant: Flipboard, Inc., Palo Alto, CA (US)

(72) Inventor: Charles Hugo Ying, Piedmont, CA (US)

(73) Assignee: Flipboard, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/474,093

(22) Filed: Mar. 30, 2017

(65) Prior Publication Data

US 2017/0206192 A1 Jul. 20, 2017

Related U.S. Application Data

(63) Continuation of application No. 14/528,766, filed on Oct. 30, 2014, now Pat. No. 9,648,080.

(51) Int. Cl.
*G06F 17/00* (2006.01)
*G06F 17/24* (2006.01)
*G06F 17/21* (2006.01)
*G06F 17/30* (2006.01)
*H04L 29/08* (2006.01)

(52) U.S. Cl.
CPC .......... *G06F 17/248* (2013.01); *G06F 17/212* (2013.01); *G06F 17/30867* (2013.01); *G06F 17/30905* (2013.01); *H04L 67/02* (2013.01)

(58) Field of Classification Search
CPC ....................................................... G06F 17/22
See application file for complete search history.

(56) References Cited

U.S. PATENT DOCUMENTS

| 8,612,851 | B2 | 12/2013 | Kiefer et al. |
| 2006/0279555 | A1 | 12/2006 | Ono |
| 2008/0240226 | A1 | 10/2008 | Okmianski et al. |
| 2010/0115399 | A1 | 5/2010 | Kohar et al. |
| 2011/0283210 | A1 | 11/2011 | Berger et al. |

(Continued)

OTHER PUBLICATIONS

PCT International Search Report and Written Opinion for PCT/US15/57425, dated Jan. 21, 2016, 12 Pages.

(Continued)

*Primary Examiner* — Mustafa Amin
(74) *Attorney, Agent, or Firm* — Fenwick & West LLP

(57) ABSTRACT

A digital magazine server displays content to a user based on a page template specifying sizing and positioning of content items. The page template is selected from a set of candidate page templates, which is determined based on characteristics of page templates and characteristics of other page templates used to present content to the user. Different characteristics of a page template are weighted based on the page template's position in a series of additional page templates used to present content and characteristics of the additional page templates. Weights associated with different characteristics of a page template are combined to determine a template score for the page template, and the template score is used to determine if the page template is a candidate page template.

16 Claims, 12 Drawing Sheets

(56) References Cited

U.S. PATENT DOCUMENTS

| | | |
|---|---|---|
| 2011/0302123 A1 | 12/2011 | Nista et al. |
| 2012/0278704 A1 | 11/2012 | Ying et al. |
| 2013/0021377 A1 | 1/2013 | Doll |
| 2013/0024757 A1* | 1/2013 | Doll .................... G06F 17/212 715/204 |
| 2013/0103677 A1 | 4/2013 | Chakra et al. |
| 2014/0074863 A1 | 3/2014 | Walkingshaw et al. |
| 2014/0075275 A1 | 3/2014 | Aleksandrovsky et al. |
| 2014/0258372 A1 | 9/2014 | Lerman et al. |
| 2015/0019943 A1 | 1/2015 | Ying et al. |
| 2015/0019957 A1 | 1/2015 | Ying et al. |
| 2015/0019958 A1 | 1/2015 | Ying et al. |
| 2016/0098172 A1 | 4/2016 | Bacinschi |

OTHER PUBLICATIONS

United States Office Action, U.S. Appl. No. 14/528,766, dated Dec. 29, 2016, 19 pages.
United States Office Action, U.S. Appl. No. 14/528,766, dated Jun. 28, 2016, 19 pages.

* cited by examiner

SELECTION OF PAGE TEMPLATES FOR PRESENTING DIGITAL MAGAZINE CONTENT BASED ON CHARACTERISTICS OF ADDITIONAL PAGE TEMPLATES

CROSS-REFERENCE TO RELATED APPLICATIONS

This application is a continuation of U.S. patent application Ser. No. 14/528,766, filed Oct. 30, 2014, which is incorporated by reference in its entirety.

BACKGROUND

This disclosure relates generally digital magazines, and more particularly to determining a layout for presentation of content items in a digital magazine on a client device.

Publishers of digital content struggle to optimize presentation of content on different devices with different display areas, different display resolutions, or differences in other display characteristics. Determining techniques for selecting content for a user and adapting the selected content for presentation to the user on a particular device create resource and performance challenges for a publisher. Additionally, the rapidly increasing number and variety of devices used to present content makes it impractical for publishers to continue to create content layouts customized to individual devices. Moreover, to maintain user engagement with content, publishers must efficiently use computing resources to prevent optimization of content presentation from negatively impacting a user's viewing experience.

SUMMARY

A digital magazine server creates a digital magazine for a user including content items for presentation to a user. The digital magazine server organizes content items having at least one common characteristic into various sections, and presents content items to the user according to the sections. To improve user interaction with content items, the digital magazine server maintains various page templates describing a spatial arrangement of content items relative to each other in a section ("layout") for presentation to a user. A page template includes one or more display regions that are each configured to present one or more content items. The position of display regions relative to each other in a page template specify the position of content items relative to each other in a section generated from the page template.

One or more display regions in a page template may specify the size of content items displayed in a page of the digital magazine (also referred to as a "section") using a percentage of a display area or a range of dimensions of a portion of the display area to specify the size of the content items displayed in a page. For example, various display regions in a page template are associated with one or more dimensions specified as a percentage of a reference dimension, such as a height or width specified as a percentage of a height or width of a display area in which a section is displayed. As another example, a display region is associated with an aspect ratio specified as a percentage of a display area in which content presented via the page template is displayed.

One or more candidate page templates for presenting content associated with the digital magazine are selected from the page templates. Information associated with other page templates associated with the digital magazine may be used to select the candidate page templates. To increase user interaction with content in the digital magazine, characteristics of additional page templates previously used to present content associated with the digital magazine or identified for presentation of subsequent content associated with the digital magazine are identified and used to select one or more candidate page templates. Various characteristics of page templates are used to select the one or more candidate page templates, and characteristics may be differently weighted based on characteristics of other page templates used for presenting content associated with the digital magazine. For example, weights are associated with characteristics of a page template based on a number of times the characteristic or a similar characteristic is associated with additional page templates associated with the digital magazine. Based on the weights associated with characteristics of a page template, a template score is determined for the page template. One or more candidate page templates are selected based on their associated page templates. For example, page templates having at least a threshold template score are selected as candidate page templates.

A weight associated with a characteristic associated with a page template may be inversely proportional to a number of times the characteristic, or a similar characteristic, is associated with additional page templates associated with the digital magazine, increasing a contribution of the characteristic to the template score associated with the page template if the characteristic is infrequently associated with other page templates associated with the digital magazine. Similarly, a weight associated with a characteristic that is associated with more than a threshold number of page templates associated with the digital magazine is lower to decrease the contribution of the characteristic to the page template's template score. Additional information may be used to select the one or more candidate page templates, such as interaction between one or more users with various content items associated with the digital magazine, characteristics associated with content items associated with the digital magazine, or a location associated with a client device used to present content items associated with the section of the digital magazine.

The candidate page templates may be scored based on the display area of the client device for presenting the section and ranked based on their associated scores. For example, scores are based on characteristics of the content items to be presented, characteristics of the display regions in various candidate page templates, the display area in which the content items are to be presented, as well as any other suitable data. For example, the amount of modification of content items to present the content item in display regions of a candidate page template is reflected in a score for the candidate page template. Types of content items and associations between display regions in a candidate page template may also affect the scores of candidate page templates. Based at least in part on the ranking, a page template is selected and used to present content items in the section.

Additionally, page template selection may account for other factors to present the user with content items presented using various page templates. In one embodiment, scores associated with page templates are modified based on previous selection of page templates. For example, a score associated with a page template is reduced if the page template was previously selected within a threshold time interval of the current time; similarly, a score associated with a page template is reduced if the page template was previously selected greater than the threshold time interval of the current time. Characteristics of the content items to be presented and various page templates may also be used to modify a score associated with a page template. For example, if the content items to be presented include at least one content item having a specified type, a score associated with a page template including a single display region associated with the specified type of content item is increased. The ranking of page templates may be modified based on modified scores associated with page templates and a page template is selected from the modified ranking.

If the selected page template includes display regions having dimensions determined by the width of the display area of the client device, the width of each region in the selected page template is specified as the width of the display area of the client device. Additionally, heights of each region in the selected page template are determined based on the width of the display area of the client device. For example, values are determined for each display region, and a height of a display region is determined as a product of the value for the display region and a percentage of the width of the display area of the client device. Various criteria may be used to determine the value for the display region, such as a type of content item associated with the display regions, values associated with other display regions in the selected page template. Example criteria for determining a value for a display region include: a type of content item to be presented in the display region, values associated with other display regions, and values associated with display regions within a specified time interval. Different values may be associated with different display regions so the selected page template presents content items using display regions with different heights.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
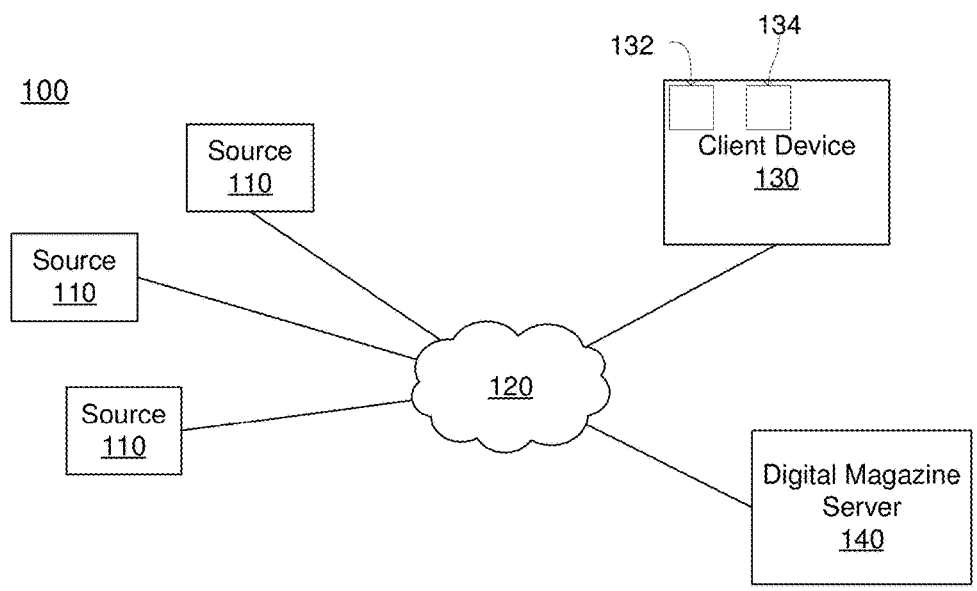
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 130 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 130, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
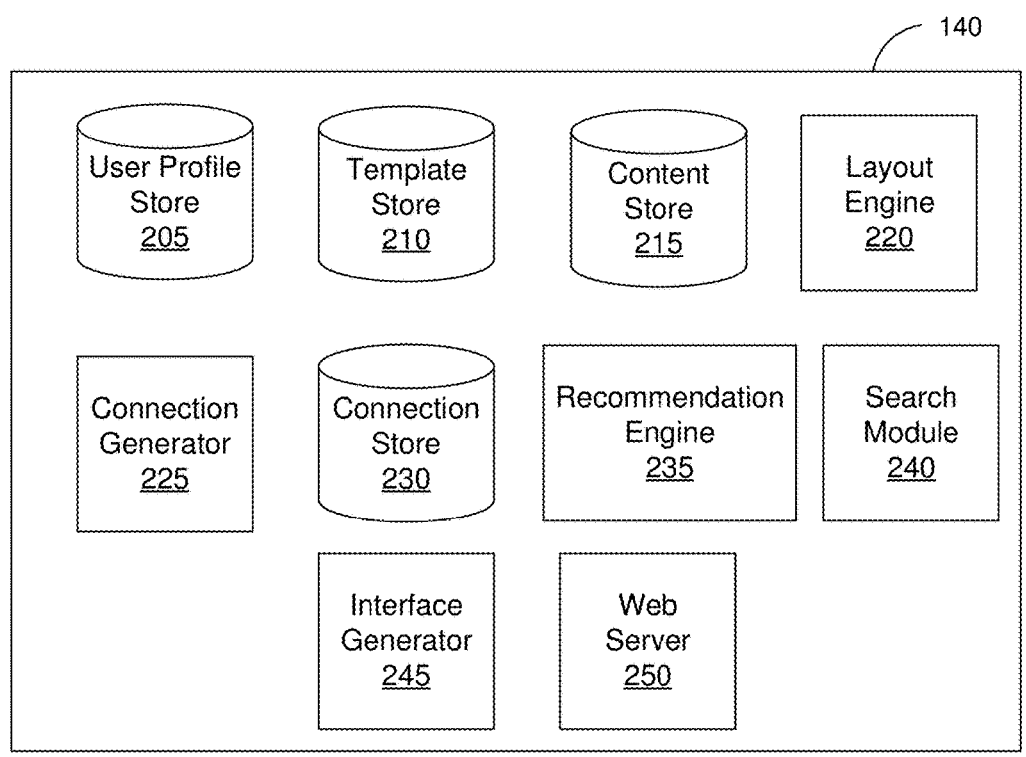
FIG. 2 is a block diagram of a digital magazine server, in accordance with an embodiment of the invention.

FIG. 2 is a block diagram of an architecture of the digital magazine server 140. In the example shown by FIG. 2, the digital magazine server 140 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more display regions, each configured to present one or more content items. In some embodiments, display regions in a page template may be configured to present a particular type of content item or to present a content item having one or more specified characteristics. For example, a display region in a page template is configured to present an image while another display region in the page template is configured to present text data. Each display region has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, and U.S. patent application Ser. No. 13/938,227, filed on Jul. 9, 2103, each of which is hereby incorporated by reference in its entirety.

In various embodiments, page templates included in the template store 210 may be defined with flexible dimensions, allowing presentation of content items to account for various sizes or dimensions of a display area in which the content items are presented. For example, a page template includes display regions specifying a percentage of a display area in which a content item is presented. Specifying a percentage of a display area for presentation of a content item allows a page template to present content items across a range of display areas and to provide consistent presentation of content items when a display area is resized. Page templates with display areas specified as percentages of a display area are further described below in conjunction with FIGS. 3-6F.

Additionally, dimensions of a display region within a page template may be determined based on dimensions of a display area in which content is presented based on the display template. For example, a width of a display region is specified as a width of a display area in which content is presented based on the page template, and the height of the display region is determined based on the width of the display area. For example, a height of the display region is determined as a product of a value and a percentage of the width of the display region. In various embodiments, the value is an integer, so the heights of various display regions are integer multiples of the percentage of the width of the display region. Different display regions in a page template may have different heights.

In some embodiments, the template store 210 includes one or more sub-templates that specify positions of content items relative to each other. A sub-template includes one or more display regions specifying sizing of content items and positioning of content items relative to each other. A display area in a page template may specify selection of a sub-template for presentation of content items within the display area. For example, a display region of a page template identifies a sub-template, allowing content items presented in the display region to be positioned relative to each other as specified by a sub-template. To improve presentation of content items, a sub-template used to present content items in a display region is selected when a page template including the display region is presented. For example, various sub-templates in the template store 210 are scored based on the display area in which content items are presented and characteristics of the content items to be presented. Based on the scores, a display sub-template is selected and used to present content items within the display region of the page template. This optimizes presentation of content items in the display region by selecting a sub-template in which content items are displayed in a format that facilitates user interactions. Alternatively, a source 110 or a user of the digital magazine server 140 associates a specific sub-template with a display area of a template, allowing the source 110 or user to customize presentation of content items in a display area of the template. Use of sub-templates to present content items is further described below in conjunction with FIG. 8.

The content store 215 stores objects that each represent various types of content. For example, the content store 215 stores content items received from one or more sources 130 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content store 215 along with an association with the user profile or the user specifying the section.

The layout engine 220 retrieves content items from one or more sources 110 or from the content store 215 and generates a section including the content items based on a page template from the template store 210. Based on the retrieved content items, the layout engine 220 may identify candidate page templates from the template store 210, score the candidate page templates based on characteristics of the display regions in different candidate page templates, based on previously-selected templates, and based on characteristics of the content items. As further described below in conjunction with FIG. 5, characteristics of additional page templates used to present content associated with a digital magazine may be used to select candidate page templates to diversify presentation of content associated with the digital magazine. Based on the scores associated with candidate page templates, the layout engine 220 selects a page template and associates the retrieved content items with one or more display regions to generate a section where the retrieved content items are presented relative to each other and sized based on their associated display regions.

In some embodiments, the layout engine 220 may use the display area of the client device 130 on which content items are to be presented when selecting a page template from the candidate page templates. In some embodiments, the layout engine 220 enforces one or more diversification policies when selecting templates to provide the user with content items arranged based on different page templates. Use of diversification policies is further described below in conjunction with FIG. 7. When associating a content item with a display region, the layout engine 220 may associate the content item with a display region configured to present a specific type of content item or to present content items having one or more specified characteristics. Examples of using a page template to present content items are further described in U.S. patent application Ser. No. 13/187,840, filed on Jul. 21, 2011, U.S. patent application Ser. No. 13/938,223, filed on Jul. 9, 2013, and U.S. patent application Ser. No. 13/938,226, filed on Jul. 9, 2013, each of which is hereby incorporated by reference in its entirety.

If a display region of the selected template specifies a sub-template, the layout engine 220 retrieves a specified sub-template from the template store. Alternatively, the layout engine 220 scores various sub-templates retrieved from the template store 210 based on characteristics of the content items, positioning and sizing of display regions within the sub-templates, and the display area of the client device 130 on which the content items are to be presented. Based on the scores associated with various sub-templates, the layout engine 220 selects a sub-template specifying sizing and relative positioning of content items presented within the display region identifying the sub-template.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a user and an additional user by analyzing the user's interactions with content items posted by the additional user, whether the content items are presented using the digital magazine server 140 or using another social networking system. Additional examples for determining social proximity between users of the digital magazine server 140 are described in U.S. patent application Ser. No. 13/905,016, filed on May 29, 2013, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 240 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 240 may present identified content items based on a ranking. One or more factors associated with the content items may be used to generate the ranking. Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 134 of a client device 130 with modifications to content presented by a digital magazine. As an example, if the input device 134 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 134 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, the digital magazine server 140 identifies content items for presentation to a user and communicates the content items to a client device 130, which selects a page template used to present the content items to the user. In another example, a digital magazine application executing on the client device 130 receives a search query from the user, selects content items based on the search query, and also selects a page template for presenting the content items to the user. Alternatively, the digital magazine server 140 and the client device 130 operate in conjunction with each other to generate a section of the digital magazine by identifying content items for inclusion in the section and determining a page template for presenting the identified content items. For example, certain functionality (e.g., identifying content items from sources) is performed by the digital magazine server 140, while other functionality (e.g., selecting a template for presenting a section of the digital magazine) is performed by a digital magazine application executing on the client device 130.

Page Templates

Figure 3:
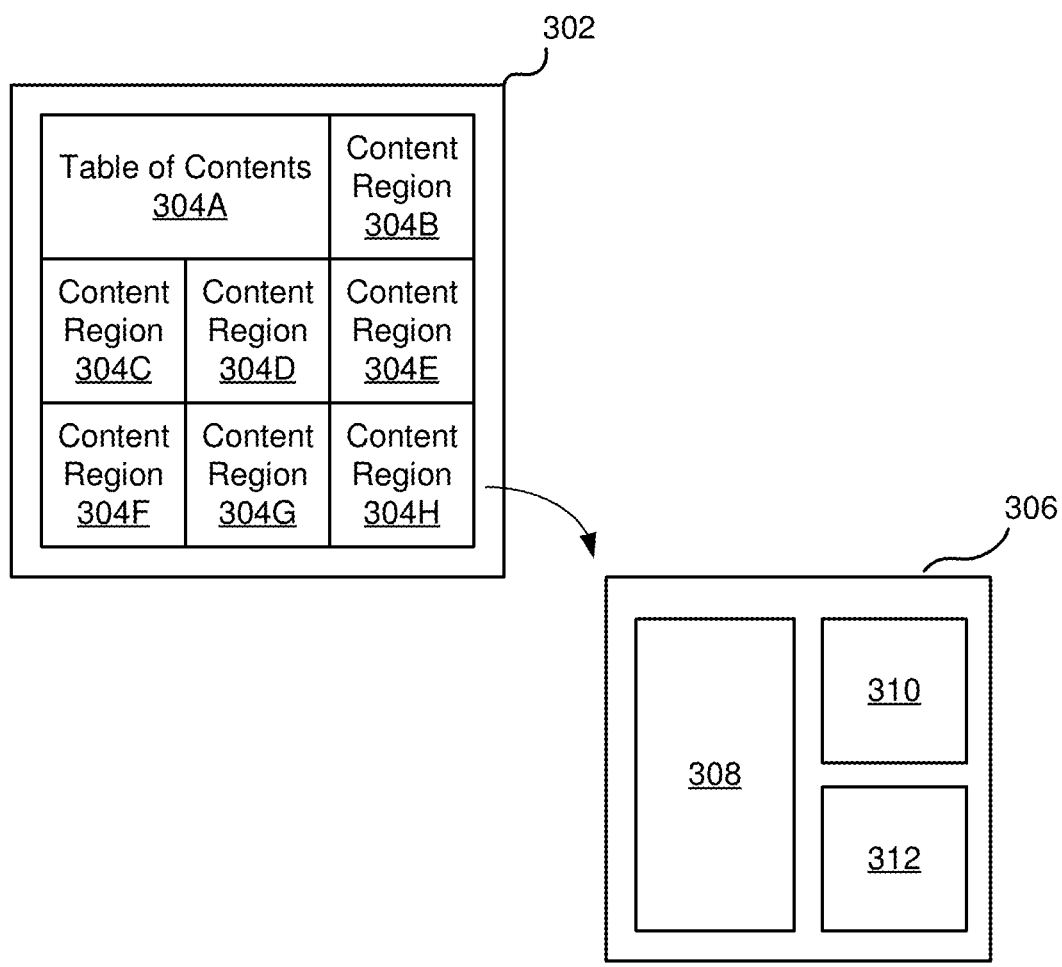
FIG. 3 is an example of presentation of content items in a digital magazine using a page template, in accordance with an embodiment of the invention.

FIG. 3 illustrates an example page template 302 having multiple rectangular display regions each configured to present a content item. Other page templates with different configurations of display regions may be used by the digital magazine server 140 to present one or more content items received from sources 110. As described above in conjunction with FIG. 2, in some embodiments, one or more display regions in a page template are reserved for presentation of content items having specific characteristics or for presentation of a specific type of content item. In one embodiment, the size of a display region may be specified as a fixed aspect ratio or using fixed dimensions. Alternatively, the size of a display may be flexible, where the aspect ratio or one or more dimensions of a display region is specified as a range, such as a percentage of a reference or a base dimension. Arrangement of display regions within a page template may also be hierarchical. For example, a page template is organized hierarchically, where an arrangement of display regions may be specified for the entire page template or for one or more portions of the page template.

In the example of FIG. 3, when a digital magazine server 140 generates a page for presentation to a user, the digital magazine server 140 populates display regions in a page template 302 with content items. Information identifying the page template 302 and associations between content items and display regions in the page template 302 is stored and used to generate the page. For example, to present a page to a user, the layout engine 220 identifies the page template 302 from the template store 210 and retrieves content items from one or more sources 110 or from the content store 215. The layout engine 220 generates data or instructions associating content items with display regions within the page template 302. Hence, the generated page includes various "content regions" presenting one or more content items associated with a display region in a location specified by the display region.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristics associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and display regions in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the display regions of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Selecting Page Template for Presenting Content Items

Figure 4:
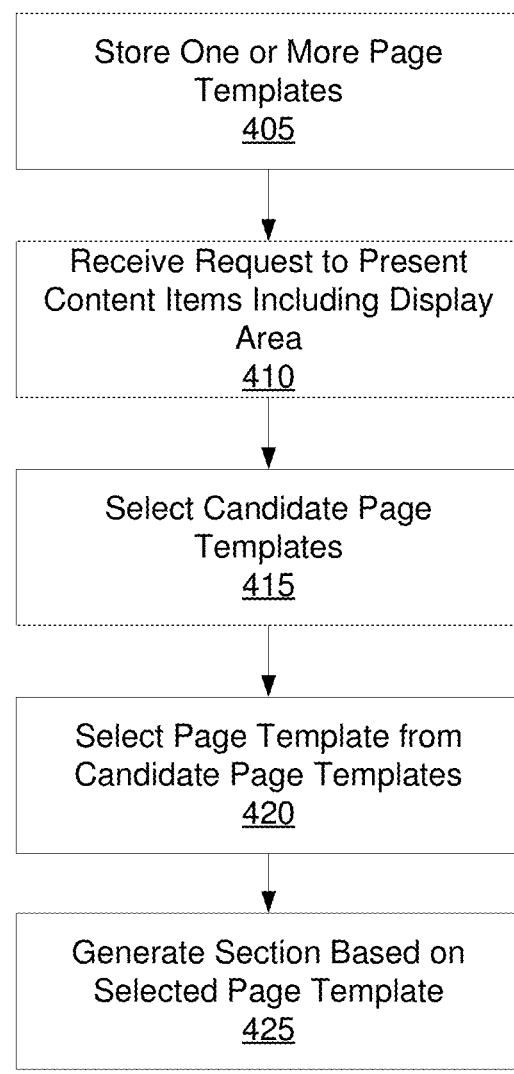
FIG. 4 is a flowchart of a method for presenting content items in a digital magazine based on a page template, in accordance with an embodiment of the invention.

FIG. 4 is a flowchart of one embodiment of a method for presenting content items in a digital magazine based on a page template. The digital magazine server 140, or a digital magazine application executing on a client device 130, stores 405 one or more page templates. For example, one or more page templates are stored in the template store 215. As described above in conjunction with FIGS. 2 and 3, a page template describes a spatial arrangement of content items relative to each other on a section ("layout") for presentation by a client device 130. A page template includes one or more display regions that are each configured to present one or more content items. The position of display regions relative to each other in a page template specify the position of content items relative to each other in a section generated from the page template.

In one embodiment, display regions in a page template are associated with a percentage of a display area to specify the size of the content items displayed in a section. For example, various display regions are associated with one or more dimensions specified as a percentage of a reference dimension, such as a height or width specified as a percentage of a height or width of a display area in which a section is displayed. As another example, a display region is associated with an aspect ratio specified as a percentage of the display area in which a section is displayed. Specifying the size of display regions as a percentage of a display area allows the size of the content items displayed based on the display regions to be easily modified as the display area changes in size. Additionally, one or more display regions in a page template may have fixed dimensions, so the size of content items presented based on fixed-dimension display regions remains unchanged as the display area presenting the section changes in size.

The digital magazine server 140, or a digital magazine application executing on a client device 130, receives 410 a request to present content items from one or more sources 110 to a user via a digital magazine. Information describing the display area of the client device 130 is included in the request. For example, physical dimensions of a display device 132 of the client device 130 are included in the request. In some embodiments, information describing the resolution of the display device 132 is included in the received request. The request may additionally include information identifying one or more characteristics of the content items for presentation. Example characteristics of the one or more content items include: one or more source identifiers, a keyword associated with the content items, a user associated with the content items, and a time interval associated with the content items.

Based at least in part on the display area of the client device, one or more candidate page templates are selected 415 from the stored page templates. For example, using information in the received request to present content items, physical dimensions for display regions in each of the stored page templates are determined; page templates having at least one display region with one or more physical dimensions less than a threshold value are not identified as candidate page templates. Hence, page templates that would present content items using dimensions that would make viewing or interacting with the content items difficult are not identified as candidate page templates. As another example, various page templates partition a display area into one or more columns, each of the various page templates is compared to information about the display area from the received requests. The columns may be specified using percentages of the display area or using specified physical dimensions. Page templates having a number of columns capable of being presented in the display area with at least a threshold physical size are selected 415 as candidate page templates, while page templates having one or more columns not capable of being presented in the display area with at least the threshold physical size are not selected as candidate page templates. For example, a display area may be unable to present more than 5 columns that each have a threshold physical size, so page templates including more than 5 columns are not selected as candidate page templates, while page templates with 5 or fewer columns are selected 415 as candidate page templates. In one embodiment, a digital magazine application executing on the client device 130 from which the request to present content items was received 410 selects 415 the candidate page templates after retrieving page templates from the digital magazine server 140 or from a storage device local to the client device 130; alternatively, the digital magazine server 140 selects 415 the candidate page templates from the template store 215.

Additionally, information associated with other page templates in the digital magazine may be used to select 415 the candidate page templates. To increase user interaction with content in the digital magazine, characteristics of additional page templates previously used to present content associated with the digital magazine or identified for presentation of subsequent content associated with the digital magazine are identified and used to select one or more candidate page templates. In various embodiments, the digital magazine server 140 uses various characteristics of page templates to select 415 the one or more candidate page templates and differently weights various characteristics based on characteristics of other page templates used for presenting content associated with the digital magazine. For example, weights are associated with characteristics of a page template based on a number of times the characteristic or a similar characteristic is associated with additional page templates associated with the digital magazine. Based on the weights associated with characteristics of a page template, a template score is determined for the page template. One or more candidate page templates are selected 415 based on their associated page templates. For example, page templates having at least a threshold template score are selected 415 as candidate page templates.

A weight associated with a characteristic associated with a page template may be inversely proportional to a number of times the characteristic, or a similar characteristic, is associated with additional page templates associated with the digital magazine, increasing a contribution of the characteristic to the template score associated with the page template if the characteristic is infrequently associated with other page templates associated with the digital magazine; similarly, a weight associated with a characteristic that is associated with more than a threshold number of page templates associated with the digital magazine is lower to decrease the contribution of the characteristic to the page template's template score. Additional information may be used to select 415 the one or more candidate page templates, such as interaction between one or more users with various content items associated with the digital magazine, characteristics associated with content items associated with the digital magazine, or a location associated with a client device 110 used to present content items associated with the section of the digital magazine. Selection of one or more candidate page templates is further described below in conjunction with FIG. 5.

From the candidate page templates, a display page template is selected 420. As further described below in conjunction with FIG. 7, scores are generated for each of the candidate page templates, and a page template is selected 420 based at least in part on the scores. In various embodiments, the scores are based on characteristics of the content items to be presented, characteristics of the display regions in various candidate page templates, the display area of the display device 132 on which the content items are to be presented, as well as any other suitable data. For example, the amount of modification of content items to present the content item in display regions of a candidate page template is reflected in a score for the candidate page template. Types of content items and associations between display regions in a candidate page template and content item types may also influence the score of the candidate page template. Diversity of page templates may be enforced when selecting 420 a page template, as further described below in conjunction with FIG. 7. For example, scores of specific candidate page templates are increased or decreased based on how recently they were selected or based on characteristics of the candidate page templates or display regions within the candidate page templates.

Using the display page template, the digital magazine server 140 or a digital magazine application executing on the client device 130 generates 425 a section including the content items from one or more sources 110. The generated section includes content regions presenting one or more content items having locations relative to each other specified by the display regions in the selected page template. Additionally, the sizes of various content regions are determined from the sizes of display regions in the selected page template from which a corresponding content region is generated. In one embodiment, the digital magazine server 140, or a digital magazine application executing on the client device 130, dynamically arranges and sizes one or more content regions including one or more content items relative to each other based on the selected page template.

In one embodiment, a size of a content region is modified based on the location of the content region within the display area if the content region presents a content item having a specified type. For example, if a content region is displaying an image and is within a threshold distance of a boundary of the display area, the content region is increased to a size where a border of the content region is within the threshold distance of the display area boundary. Increasing the size of certain content regions based on the type of presented content items allows users to more easily view or interact with certain content items, increasing user interaction with content items presented via the digital magazine.

As further described in conjunction with FIGS. 6A-6F, after the section is generated 425 and presented to a user via the client device 130, the size of display area available for presenting the section may be modified. For example, the section is displayed in a window of a laptop computer and a user or application modifies the size of the window displaying the section. Information including the modified size of the display area is communicated to a digital magazine application executing on the client device 130, which selects 415 candidate page templates, as described above, based on the modified size of the display area. A page template is selected 420 and used to generate 425 a modified section based on the modified size of the display area, as described above. Hence, the layout of a section may be dynamically modified as the display area available for presenting the section is modified, increasing user engagement with the presented content items.

In one embodiment, the presentation of a content item is modified based on the size of a content region of the selected page template for displaying the particular content item. For example, if the text to be included in a content region is greater than a threshold area of a content region of a selected template, the text is reduced to a size where the entire text can be displayed within the target content region of the selected template. Known techniques for modifying attributes of a content item may be employed to reduced text, an image, video, or other content items such that the modified content item is suitable for presentation in a target content region. Using the selected page template, the digital magazine server 140 presents a section that includes the modified content item along with any selected unmodified content items. Modifying the size of certain content items based on the area of the target content region in a selected template allows the digital magazine server 140 to make a rough selection of a page template and then modify the size of the content item based on the area of a target content region. In turn, the digital magazine server 140 can more easily select a page template and generate a section based on the selected template.

Selecting Candidate Page Templates

Figure 5:
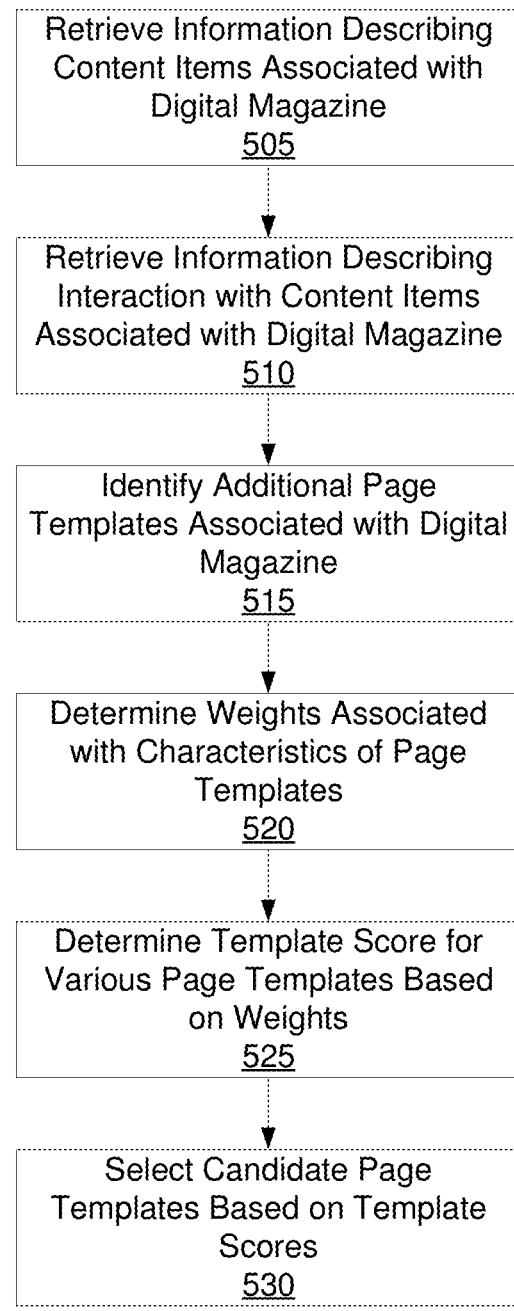
FIG. 5 is a flowchart of a method for selecting candidate page templates for presenting content items in a digital magazine based at least in part on additional page templates associated with the digital magazine, in accordance with an embodiment of the invention.

FIG. 5 is a flowchart of one embodiment of a method for selecting 415 one or more candidate page templates candidate page templates for presenting content items in a section of a digital magazine based at least in part on additional page templates associated with the digital magazine. In various embodiments, the method may include different or additional steps than those described in conjunction with FIG. 5. Additionally, in various embodiments, the steps of the method may be performed in different orders than the order described in conjunction with FIG. 5.

When selecting 415 one or more candidate page templates from which a page template is selected for presentation to a user via a digital magazine, the digital magazine server 140, the digital magazine server 140, or an application associated with the digital magazine server 140 and executing on the client device 110, retrieves 505 information describing content items associated with the digital magazine. The retrieved information includes characteristics associated with the content items. Example characteristics of a content item include a source 110 from which the content item was received, a type of content presented by the content item (e.g., image data, video data, text data), an amount of content included in the content item, and a location associated with the content item. The content items for which information is retrieved may be content items previously presented to the user, content items included in the digital magazine and not presented to the user, or any suitable content items included in the digital magazine.

In some embodiments, the digital magazine server 140, or an application associated with the digital magazine server 140 and executing on the client device 110, retrieves 510 information describing interaction with content items associated with the digital magazine. The digital magazine server 140 may retrieve 510 information describing interactions by the user with content items associated with the digital magazine and previously presented to the user, information describing interactions by various users of the digital magazine server 140 with content items associated with the digital magazine, or information describing both interactions by the user with previously presented content items associated with the digital magazine and information describing interactions by various users of the digital magazine server 140 with content items associated with the digital magazine. Example information describing interactions with a content item associated with the digital magazine include: an indication of a type of interaction with the content item, a length of time a user interacted with the content item, a time when an interaction with the content item occurred, a type of client device 110 from which an interaction with the content item was received, and characteristics of a client device 110 from which an interaction with the content item was received (e.g., display device 132 characteristics).

Additionally, the digital magazine server 140, or a digital magazine application associated with the digital magazine server 140 and executing on a client device 110, identifies 515 one or more additional page templates associated with the digital magazine. The identified additional page templates include page templates used to previously present content items associated with the digital magazine and page templates associated with content items to be subsequently presented. When identifying 515 the additional page templates, the digital magazine server 140 also identifies an order associated with the additional page templates based on times when the additional page templates were used to present content items. By identifying additional page templates used to present content associated with the digital magazine, the digital magazine server 140 may increase the variety of layouts used to present content items by accounting for characteristics of the additional page templates to select one or more candidate page templates having different characteristics for presenting content items then the additional page templates.

Based on characteristics of the identified additional page templates associated with the digital magazine, the digital magazine server 140 determines 520 weights associated with characteristics of various page templates. Example characteristics of a page template include: a number of content items associated with a page template, types of content items associated with a page template, a percentage of content items associated with a page template having a certain type, and dimensions associated with display regions in a page template. In some embodiments, weights associated with characteristics of a page template are inversely proportional to a number of times the characteristic, or a similar characteristic, is associated with additional page templates associated with the digital magazine, so a weight associated with a characteristic that is associated with less than a threshold number of additional page templates associated with the digital magazine has a higher weight than a weight associated with an additional characteristic associated with greater than the threshold number of additional page templates associated with the digital magazine. In various embodiments, a weight associated with a characteristic of a page template may be determined 520 based on a number of additional page templates previously used to present content from the digital magazine to the user having the characteristic, a number of additional page templates selected to subsequently present content from the digital magazine having the characteristic, or a number of additional page templates previously selected and subsequently selected to present content from the digital magazine.

In some embodiments, a position of a page template relative to the additional page template affects the weights associated with one or more characteristics of the page template. For example, a position in the digital magazine is associated with each page template used to present content associated with the digital magazine, with the positions indicating an order in which page templates were used to present content. For example, if content associated with the digital magazine has previously been presented using three additional page templates, each of the additional page templates is associated with a position; the first additional page template used to present content is associated with a first position, while the second and third additional page templates used to present content are associated with a second and a third position, respectively. The position in which a page template is used to display content may affect determination of weights associated with characteristics of the page template. In some embodiments, a weight associated with a characteristic may be based at least in part on a function dependent on a position in which the page template is used to display content. For example, a weight associated with a number of content items included in a page template is inversely proportional to a position in which the page template is used to present content, so the number of content items included in the page template is weighted higher if the page template presents content in an early position (e.g., a first or a second position) and is weighted lower if the page template presents content in a later position. The function used to determine 520 a weight associated with a characteristic of a page template may be periodic, with a period specified by a threshold number of positions. Different functions may be used to determine 520 weights associated with different characteristics of a page template, so different characteristics are differently weighted.

Based on the weights associated with various characteristics of different page templates, a template score is determined 525 for each of the different page templates. For example, the template score for a page template is a sum of the weights associated with the page template. A template score for a page template may be modified based on additional information associated, such as the retrieved information describing content items associated with the digital magazine or the retrieved information describing user interaction with content items associated with the digital magazine. For example, prior interactions between the user and content items associated with the digital magazine previously presented to the user may be used to modify a template score for a page template associated with content items having one or more characteristics (e.g., source 110, author, topic, type of content, size, etc.) matching or similar to characteristics of content items with which the user previously interacted. Additionally, an amount of modification to a template score may be based on a position in which a page template is to present content. If the user has at least a threshold frequency or amount of interaction with a particular type of content item, a template score for a page template including display regions associated with the particular type of content item may be increased. In some embodiments, the length of time with which a user interacts with one or more previously presented content items is used to determine user interaction with content items having various characteristics. For example, a user accessing a content item for more than a threshold amounts of time indicates the user viewed the content item, which is identified as a type of interaction with a content item that may be used to modify a template score associated with a page template including one or more display regions associated with content items having characteristics matching or similar to those of the content item. Attributes of a client device 110 may also be used when determining prior user interactions with content items. For example, different threshold amounts of time for determining a user viewed a content item are associated with mobile devices, tablet computers, and laptop computers.

Additionally, content included in the retrieved content items may be used to modify template scores for various page templates. For example, a type of content item associated with one or more display regions in a page template may increase or decrease the template score associated with the page template. In some embodiments, an amount of modification to a template score based on a type of content item is based in part on a position in which a page template is to present content. For example, a page template's template score is increased if it is for presentation in a position less than a threshold position and includes one or more display regions associated with content items identified as time-sensitive (e.g., sports scores, news stories). A location associated with the client device 110 on which content items are to be presented as well as a location associated with one or more content items may modify the template score associated with a page template. For example, if one or more content items associated with display regions in a page template are also associated with a location within a threshold distance of a location of the client device 110, a template score for the page template is increased.

Based on the template scores for various page templates, one or more candidate page templates are selected 530 from the one or more page templates. In one embodiment, page templates are ranked based on their template scores, and page templates having at least a threshold position in the ranking or having highest positions in the ranking are selected 530 as candidate page templates. Alternatively, page templates having at least a threshold template score are selected 530 as candidate page templates. A page template is then selected from the candidate page templates, as described above in conjunction with FIG. 4 and further described below in conjunction with FIG. 7.

Presentation of Content Items Via an Adjustable Page Template

Figure 6A:
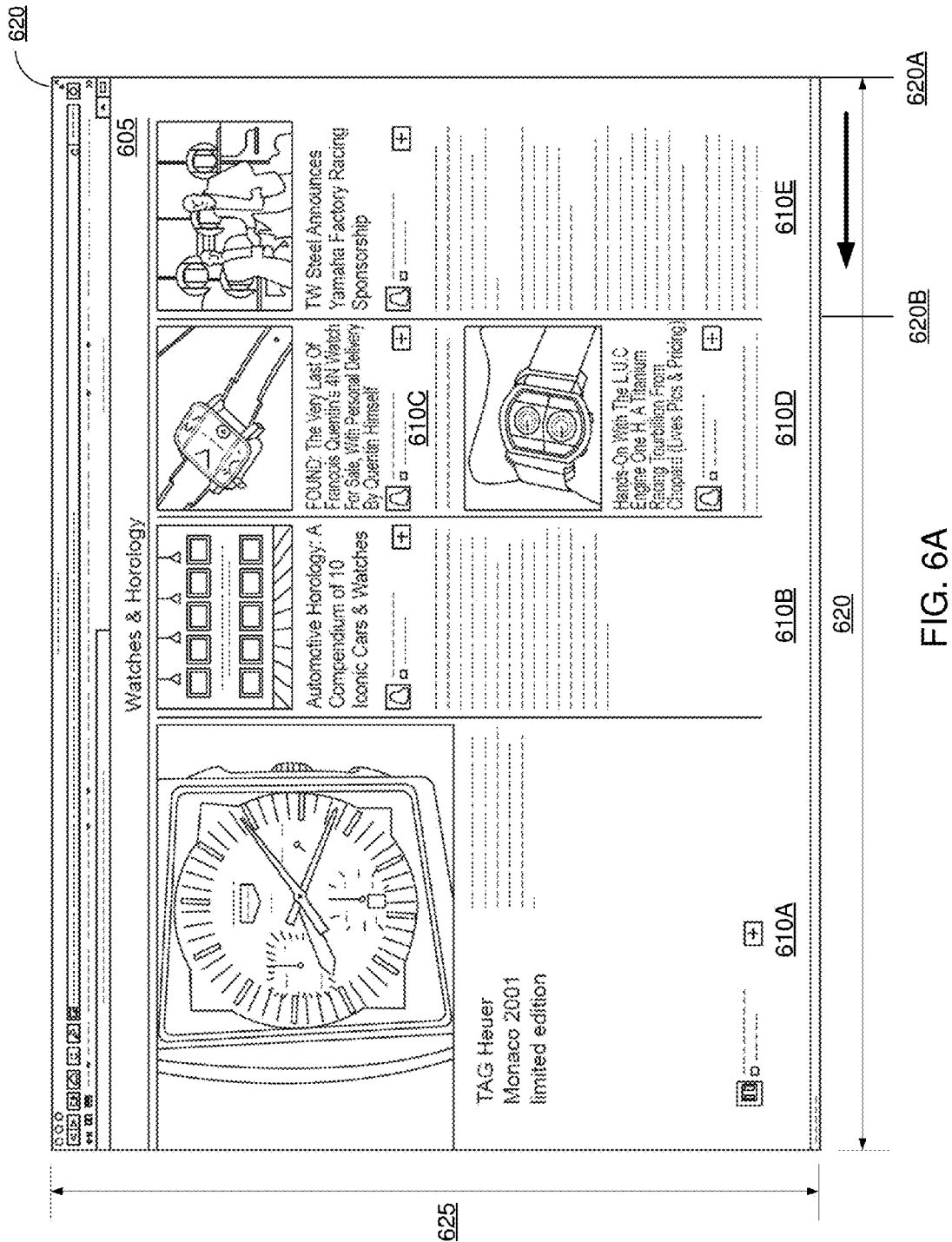
FIGS. 6A-6F are examples of modifying presentation of content items in a digital magazine using a dynamically adjustable page template as the display area available for presenting the content items is modified, in accordance with an embodiment of then invention.
Figure 6B:
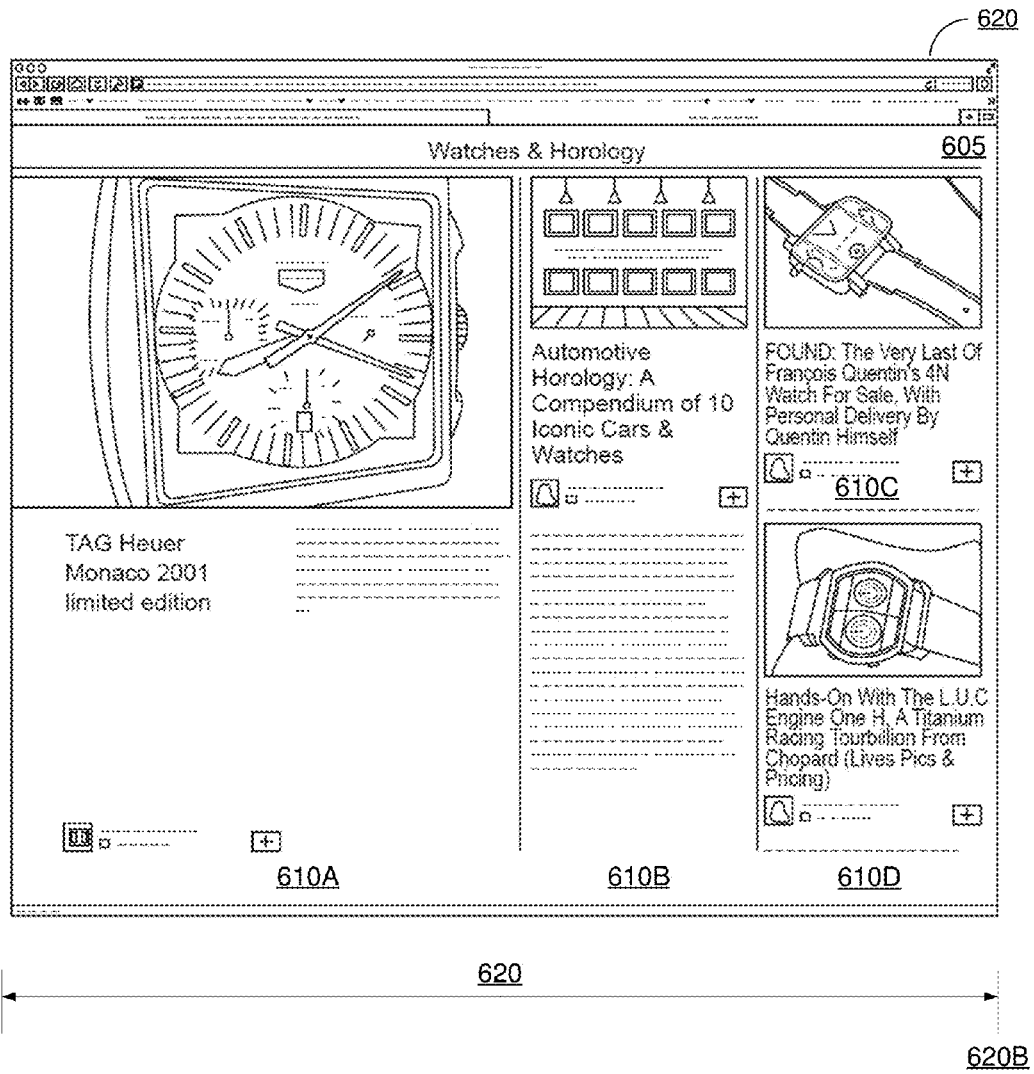
Figure 6C:
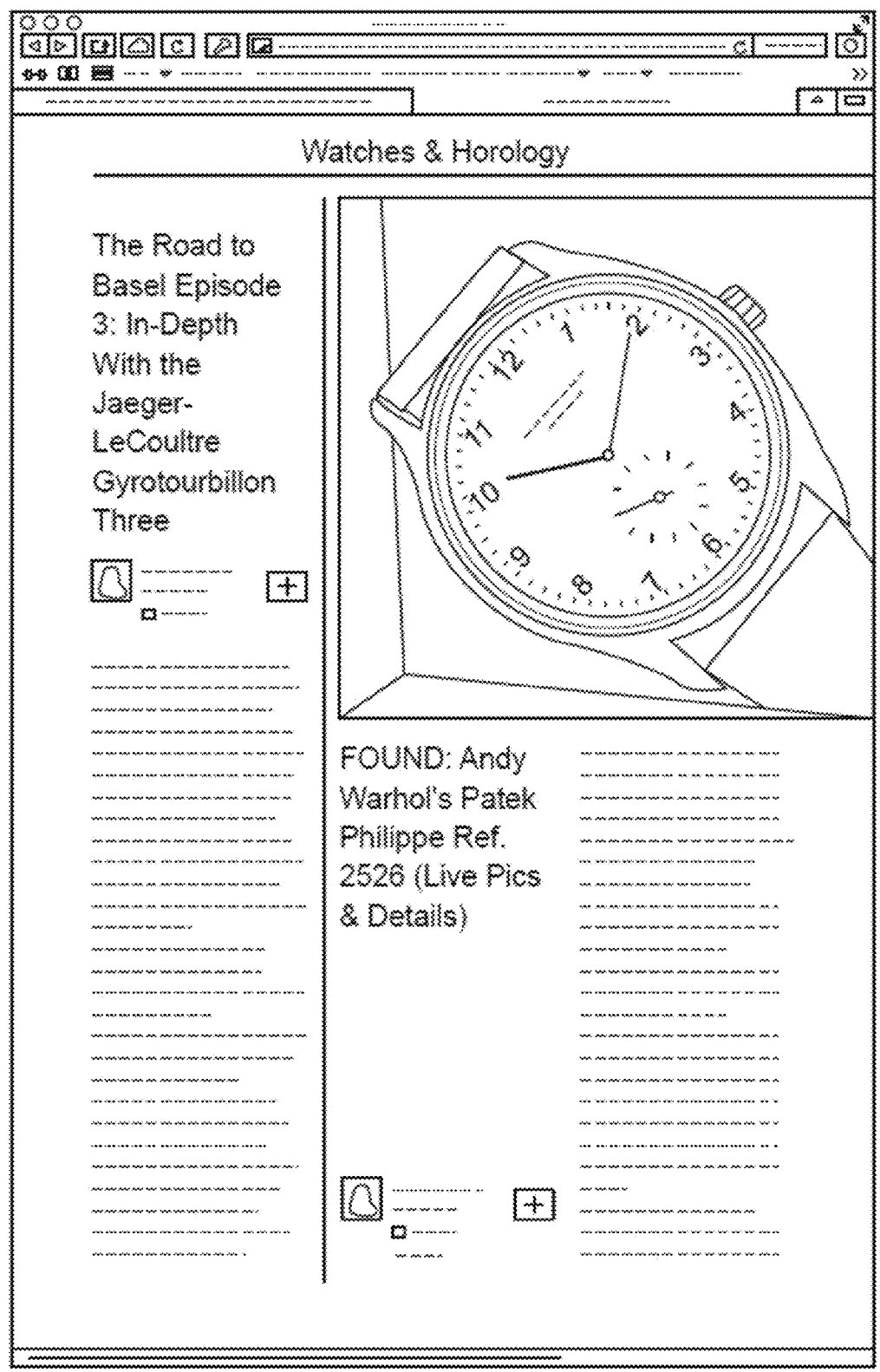
Figure 6D:
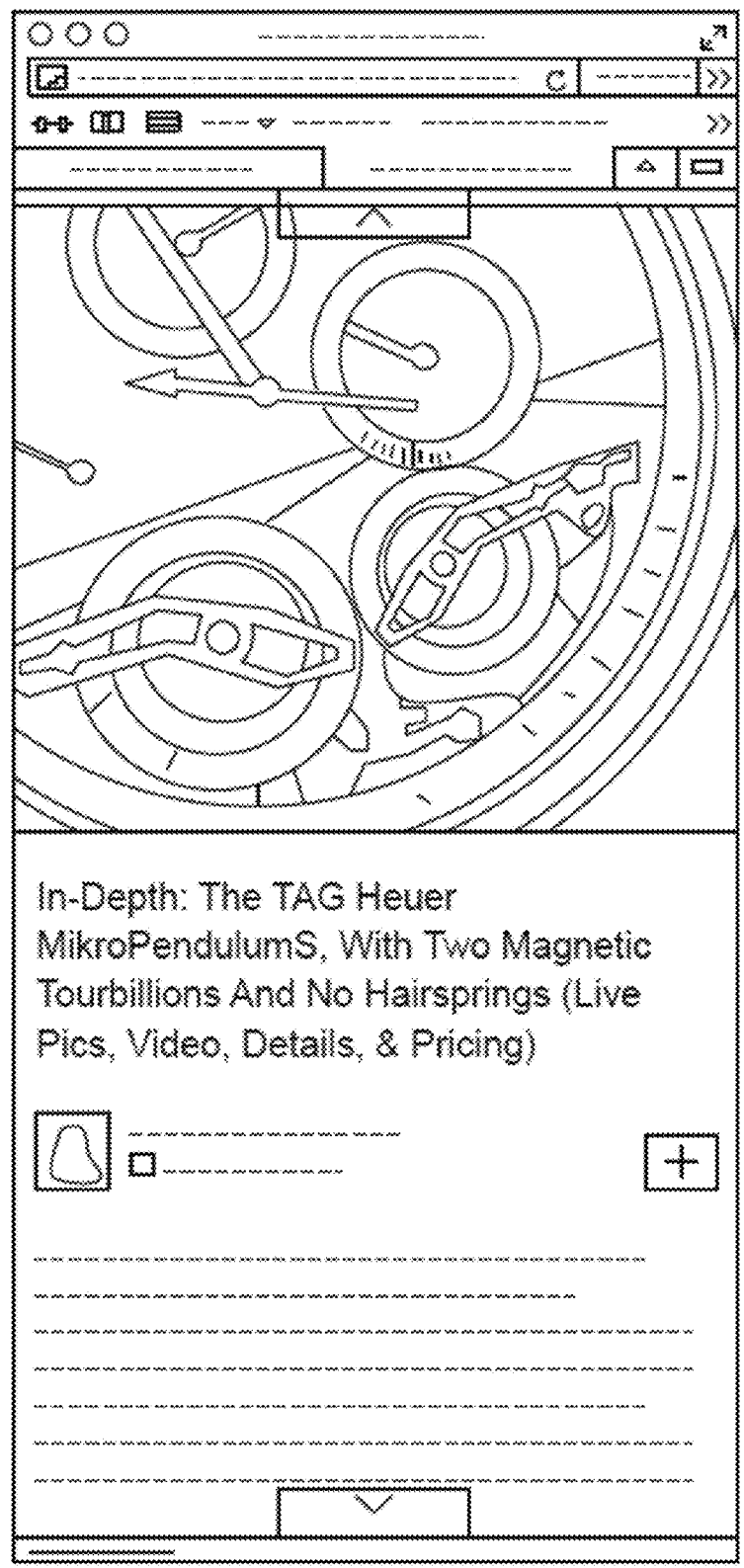

FIG. 6A is an example presentation of content items in a digital magazine using an adjustable page template as a display area is modified. In the example shown by FIG. 6A, a section 605 is generated and displayed on a display device 132 of a client device 130 based on a selected page template. The section 605 labeled, "Watches &Horology," includes display regions 610A, 610B, 610C, 610D, and 610E. As previously described, each display region presents one or more content items having locations relative to each other specified by the display regions in the selected page template. One or more display regions may be modified or hidden from view based on inputs received from a user of the client device 130. For example, a display region is modified when a gesture moving simulating movement of a dimension of a display area of the display device 132 from an initial position to a modified position. As a more specific example, if a gesture simulating moving a display area dimension 620 from an initial position 620A to a secondary position 620B is received via the client device 130 and communicated to an application executing on the client device 130 and associated with the digital magazine server 140, display region 610E and content items included in display region 610E are hidden from view, as shown in FIG. 6B. In other embodiments, content items included display region 610E may be redistributed to one or more additional display regions that remain visible when a gesture simulating reducing display area dimension 620 from an initial position 620A to a secondary position 620B. Further modifications to the display area in which the section 605 is displayed, may result in an incremental reduction in the number of remaining visible display regions until a minimum number of display regions, specified by the selected page template, are displayed. For example, various modifications to display area dimension 620 reduce the number of display regions 610 presented by the section 605 from five display regions to three display regions to two display regions, as shown in FIG. 6C, and ending with a single display region remaining visible, as shown in FIG. 6D. An additional display area dimension 625 may be modified in a similar manner as display area dimension 620. For example, display area dimension 620 is a horizontal dimension and additional display area dimension 625 is a vertical dimension.

Figure 6E:
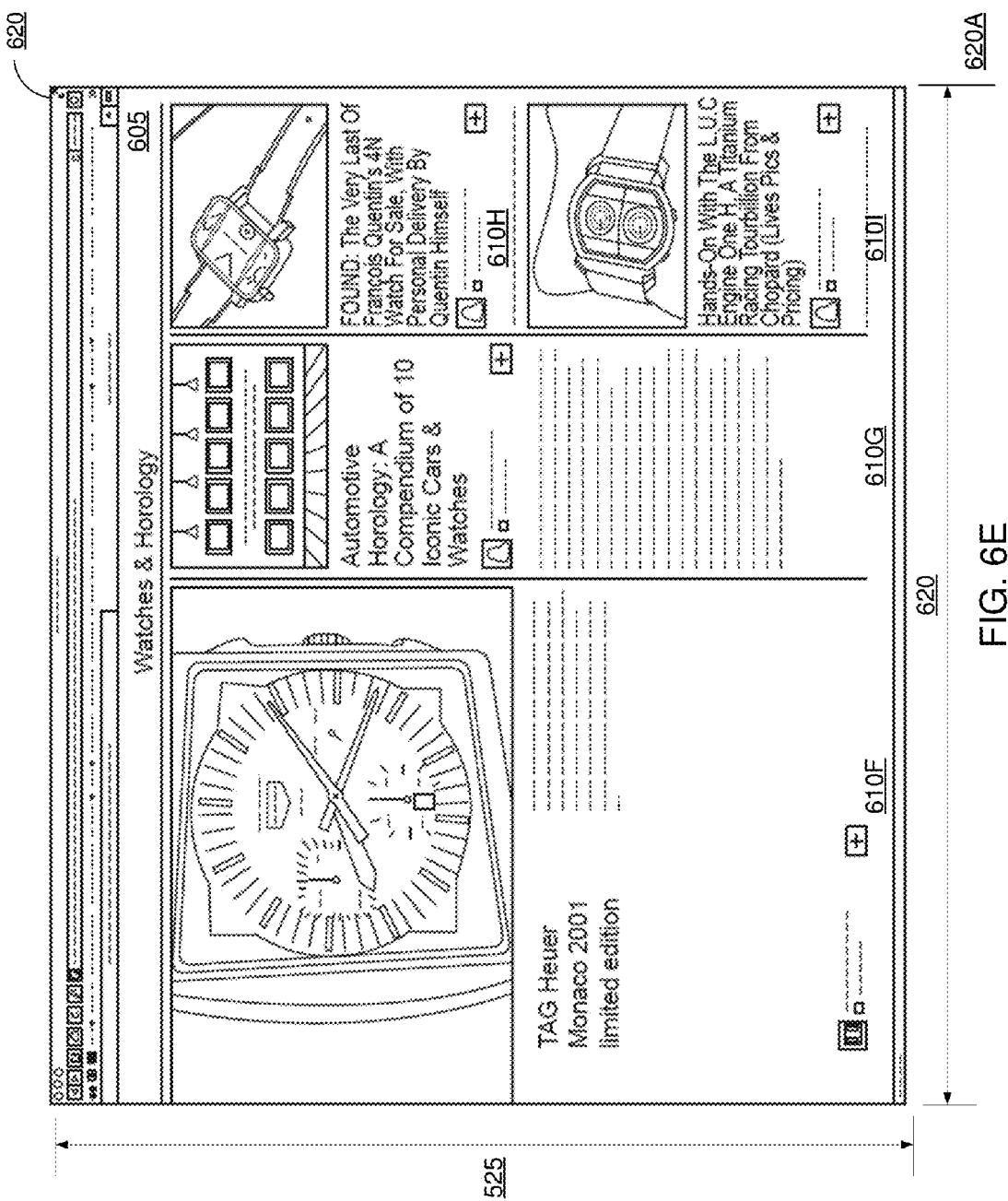
Figure 6F:
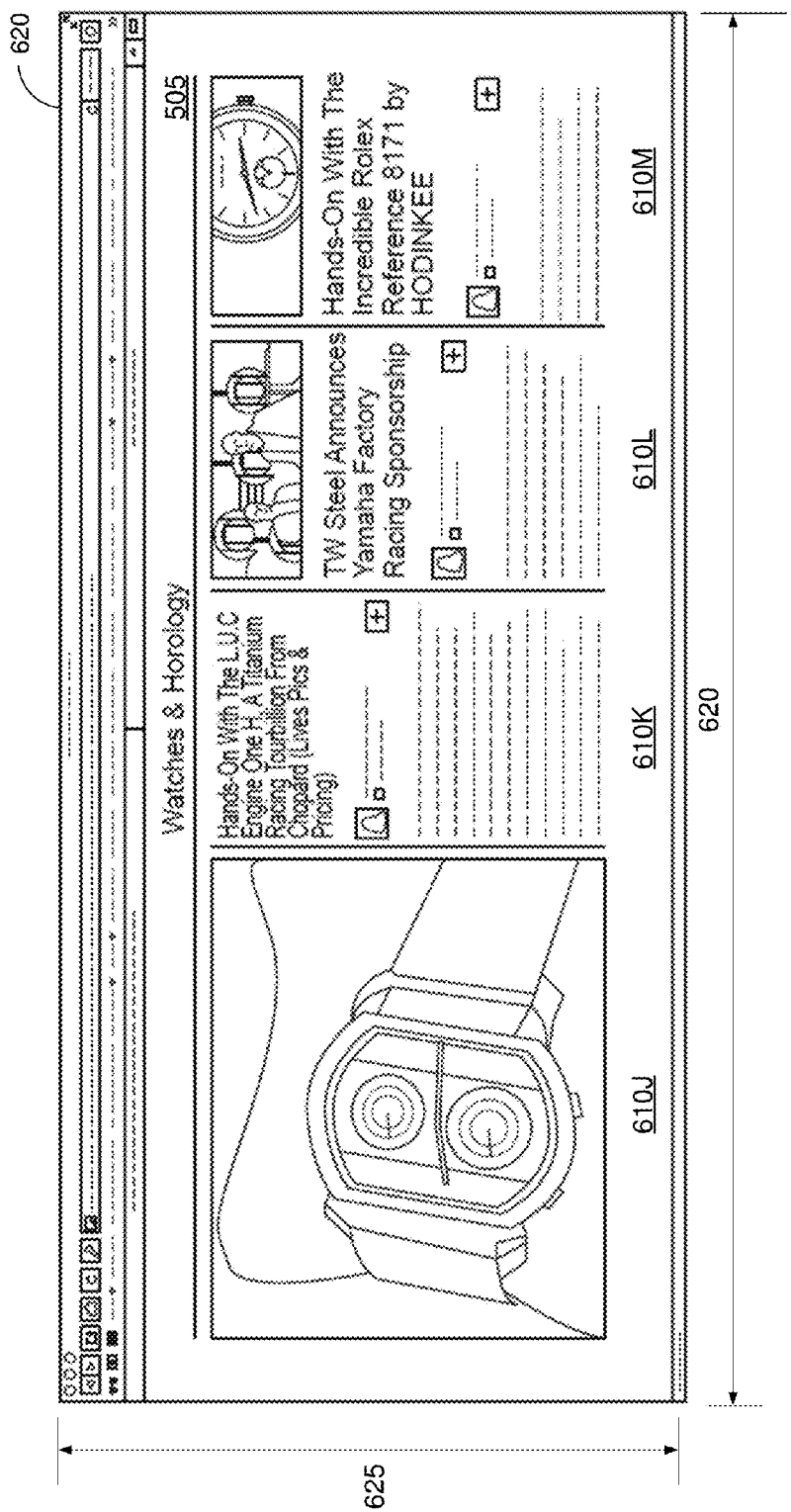

For example, as shown in FIG. 6E, presentation of content items as a display area dimension 620, 625 is modified is based on the page template selected for presentation of the content items. For example, a selected page template redistributes content items from their initial display regions 610F, 610G, 610H, and 610I to alternative display regions 610J, 610K, 610L, and 610M when a display area dimension 620, 625 is modified. In another embodiment, the selected page template hides content items within one or more display regions 610 from view when a display area dimension 620, 625 is modified as shown in FIG. 6F. Alternatively, the digital magazine server 140, or an application executing on the client device 130 and associated with the digital magazine server 140, selects an additional page template for presenting additional content items if a display area dimension 620, 625 is modified (e.g., if a display area dimension 620, 625 is increased). This allows dynamic modification of a section's layout based on modifications to the display area available for presenting the section, presenting content items in a layout best suited to increase user engagement with the content items.

Figure 7:
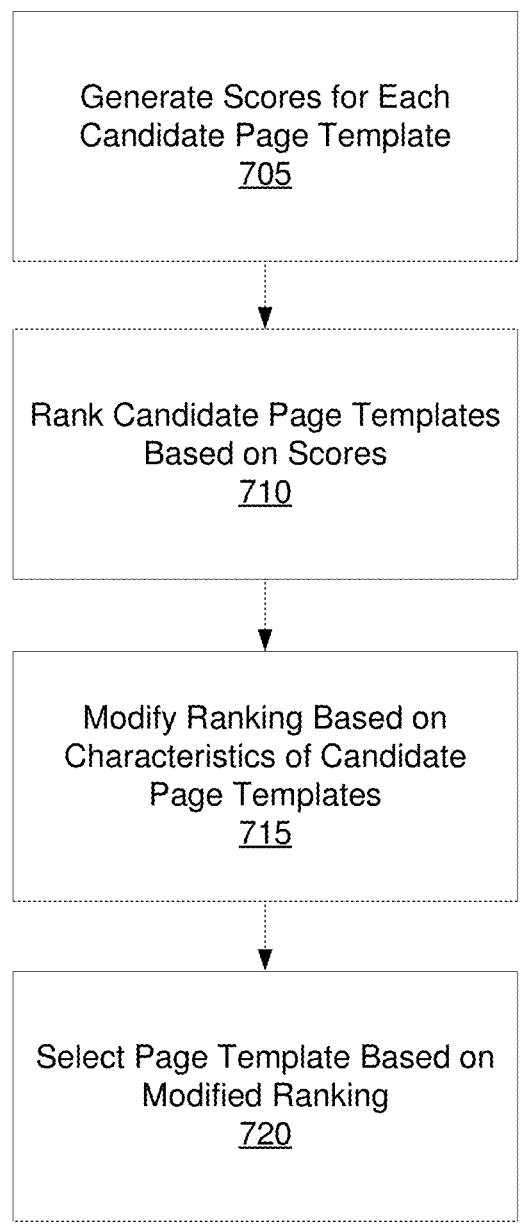
FIG. 7 is a flowchart of a method for selecting a page template for presenting content items in a digital magazine, in accordance with an embodiment of the invention.

FIG. 7 is a flowchart of one embodiment of a method for selecting 420 a page template for presenting content items in a digital magazine. In the embodiment shown by FIG. 7, scores for each candidate page template are generated 705. Various criteria may be used to generate 705 a score for a candidate page template. For example, a score for a candidate template is based on sub-scores calculated for various display regions within the candidate template that provide a measure of the amount of modification to a content item for presentation in a display region within the candidate template. In one embodiment, a greater amount of modification to a content item (e.g., rescaling, cropping, rotating, etc.) to present the content item in a display region results in a lower sub-score for the display region; similarly, a reduced amount of modification to a content item for presentation in a display region results in a higher sub-score for the display region. The sub-scores for various display regions in a page template are combined to determine the score for the page template. Additionally, display regions within a page template may be associated with types of content items, and the score of the page template may be based in part on a number of content items to be presented having a type that matches a type of content item associated with a display region within the page template. Further examples of generating 705 a score for a candidate page template are provided in U.S. patent application Ser. No. 13/096,989, filed on Apr. 28, 2011, which is incorporated by reference herein in its entirety.

The candidate page templates are ranked 710 based on their associated score. For example, candidate page templates having a higher score have a higher position in the ranking. The ranking of candidate page templates is modified 715 based on one or more characteristics of the candidate page template to increase the likelihood of diverse page templates being used to present content items. For example, the scores of one or more candidate page templates are modified based on characteristics of the candidate page templates, and the modified scores are used to modify 715 the position of various candidate page templates in the ranking. This allows the digital magazine to provide a diverse presentation of content items to increase the likelihood of users accessing or interacting with the digital magazine.

For example, a score associated with a candidate page template is modified based on a time interval when the candidate page template was previously used to present content items. In one embodiment, a candidate page template's score is reduced if the candidate page template was previously selected within a threshold time interval of a current time. The candidate page template's score may be reduced by an amount that is inversely proportional to the time interval between the current time and a prior selection of the candidate page template for content item presentation. For example, scores of candidate page templates selected within a threshold time interval from the current time are reduced by a greater amount than scores of candidate page templates selected greater than the threshold time interval. Similarly, scores of candidate page templates previously selected greater than a threshold time interval from the current time may be increased, which places these candidate page templates in a higher position within the ranking and increases the likelihood of their selection.

Additional characteristics of a candidate page template may be used to modify a score associated with the candidate page template, which modifies its position within the ranking. For example, scores associated with candidate page templates having a specified number of display regions or less than a threshold number of content regions are increased and the ranking is modified 715 accordingly. As another example, if the content items to be presented include at least one content item having a specified type, a score associated with a page template including a single display region associated with the specified type of content item is increased; hence, a page template including a single display region for presenting an image may have its score increased to modify 715 its position in the ranking, increasing the likelihood of its selection if content items to be presented include at least one image.

Additionally, the ranking may be modified 715 based on a sequence of page templates provided by a source 110 or by the user being presented with the content items. For example, the sequence of page templates identifies an order for selecting page templates for presentation, so a score associated with the initial page template in the sequence is increased to raise its position in the ranking and to increase the likelihood of its selection. After the initial page template is selected, an indication that the initial page template was selected is generated and a score associated subsequent page template in the sequence of page templates is increased when a subsequent request to present content items is received by the digital magazine server 140 or by a digital magazine application executing on a client device 130. This allows a user or a source 110 to customize presentation of content items to the user.

From the modified ranking, a page template is selected 720 from the candidate page template. As described above in conjunction with FIG. 4, a section displaying the one or more content items is generated 425 using the selected candidate page template. While various examples of modifying 715 a ranking of candidate page templates are provided above in conjunction with FIG. 7, any suitable method for modifying the ranking may be used. For example, rather than modifying the scores associated with various candidate page templates, the position of various page templates in the ranking may be modified 715 while the scores associated with the page templates remain unchanged.

Section Generation Using Page Templates and Sub-Templates

Figure 8:
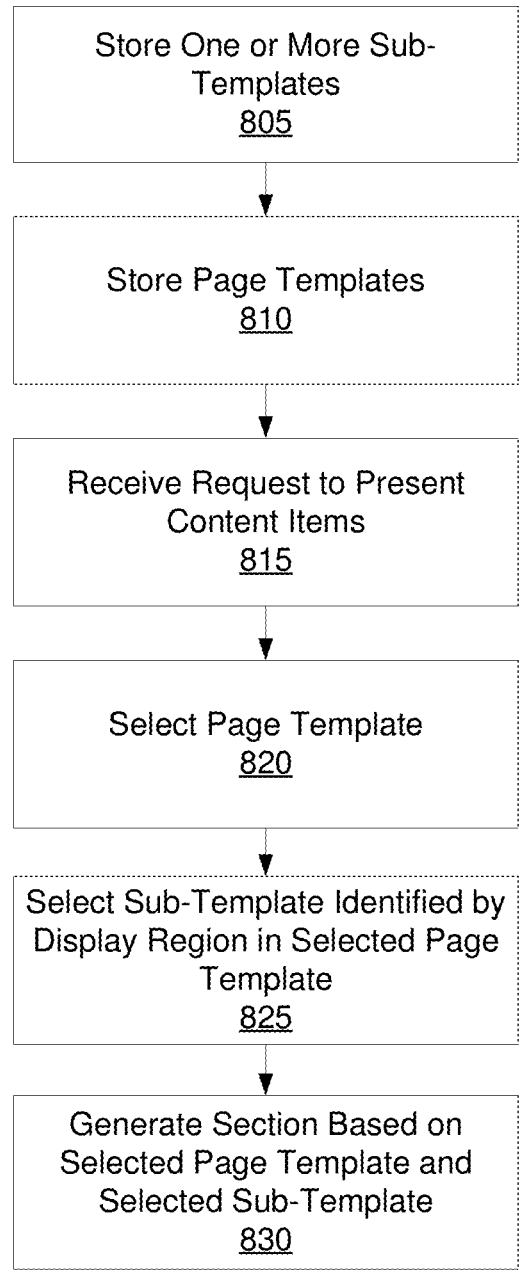
FIG. 8 is a flowchart of a method for presenting content items in a digital magazine using a page template and a sub-template associated with the page template, in accordance with an embodiment of the invention.

FIG. 8 is a flowchart of one embodiment of a method for presenting content items in a digital magazine using a page template and a sub-template associated with the page template. The digital magazine server 140, or a digital magazine application executing on a client device 130, stores 805 one or more sub-templates. For example, one or more sub-templates are stored in the template store 215. As described above in conjunction with FIG. 2, a sub-template describes a spatial arrangement of content items relative to each other when presented by a client device 130. A sub-template includes one or more display regions that are each configured to present one or more content items. The position of display regions relative to each other in a page template specify the position of content items relative to each other in a page generated from the page template. Similarly, the size of a display region in a sub-template indicates the size with which a content item is presented. Additionally, a display region of a sub-template may identify a sub-template, so content items within the display region are presented according to the relative positioning and sizing specified by the identified sub-template.

One or more page templates, as described above in conjunction with FIGS. 2-4 are stored 810 in the template store 215 or in a local storage device included in a client device 130. As described above in conjunction with FIGS. 2-4, a page template includes one or more display regions each configured to present one or more content items and describing a spatial arrangement of content items relative to each other on a section ("layout") for presentation by a client device 130. The position of display regions relative to each other in a page template specify the position of content items relative to each other in a section generated from the page template. Similarly, the size of a display region in a page template indicates the size with which a content item is presented.

A page template may include a display region that identifies a sub-template to present content items within the display region according to the relative positioning and sizing specified by the identified sub-template. In one embodiment, a display region of a page template identifies a specific sub-template; when a section is generated using the page template, content items included in the display region are presented using relative positioning and sizing information in the specific sub-template. Alternatively, a display region of a page template identifies that content items in the display region are presented based on a sub-template; when the page template is selected, a sub-template is selected from the sub-template and the selected sub-template is used to present content items. In another embodiment, a display region of a page template identifies a group of sub-templates; when the page template is selected, a sub-template from the identified group is selected and content items are presented in the display region based on positioning and sizing information included in the selected sub-template.

The digital magazine server 140, or a digital magazine application executing on a client device 130, receives 815 a request to present content items from one or more sources 110 via a digital magazine. Information describing the display area of the client device 130 is included in the request, as described above in conjunction with FIG. 4. For example, physical dimensions of a display device 132 of the client device 130 are included in the request.

Based at least in part on the display area of the client device, a page template is selected 820 from the stored page templates. Selection of page templates is further described above in conjunction with FIGS. 4 and 7. For example, candidate page templates are identified based at least in part on the display area of the client device and each candidate page template is scored based on characteristics of the candidate page templates, characteristics of the one or more content items, and the display area. Based on the scores, a display page template is selected 620 from the candidate page templates.

If the selected page template includes a display region identifying a sub-template, a display sub-template is selected 825 from the stored sub-templates. If the display region in the selected page template identifies a specific sub-template, the specific sub-template is selected 825. However, if the display region in the selected page template indicates use of a sub-template to present content items, at least a subset of the stored sub-templates are ranked based on the display area of the client device 130 and characteristics of the one or more content items to be presented. For example, each stored sub-templates are scored based on the amount of modification to one or more content items to present the content items in display regions of a sub-template and the sub-templates are ranked based on their scores. A sub-template is selected 825 based on the ranking. In some embodiments, the display region in the selected page template identifies a group of sub-templates, so a sub-template is selected 825 from the identified group of sub-templates; for example, each sub-template in the group is scored and a display sub-template is selected from the group based on the scores. The methods for selecting a page template described above in conjunction with FIGS. 4 and 7 may similarly be used to select 825 a display sub-template.

Using the selected page template and display sub-template, the digital magazine server 140 or a digital magazine application executing on the client device 130 generates 830 a section including the content items from one or more sources 110. As described above in conjunction with FIG. 4, the generated section includes content regions presenting one or more content items having locations relative to each other specified by the display regions in the selected page template. Similarly, a content region corresponding to the display region identifying use of a sub-template for content item presentation includes sub-content regions having relative positioning and sizing specified by display regions in the selected sub-template. As described above in conjunction with FIG. 4, if the display area in which the generated section is modified, an alternative page template and display sub-template may be selected using the above-described method and the modified display area, allowing presentation of content items to be dynamically modified as the display area changes.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating a digital magazine, the method comprising:
   storing a plurality of page templates, each page template including one or more regions, each region configured to present one or more content items, one or more of the plurality of page templates including one or more regions, each region associated with a height that is based on a width of a display area;
   receiving a request from a client device to present one or more content items from one or more sources in the digital magazine to a user;
   retrieving information describing content items associated with the digital magazine;
   retrieving information describing user interaction with one or more content items associated with the digital magazine;
   identifying one or more page templates previously associated with the digital magazine from the one or more page templates;
   selecting one or more candidate page templates based at least in part on one or more selected from a group consisting of: the identified one or more page templates previously associated with the digital magazine, one or more characteristics of the content items associated with the digital magazine, the user interaction with the one or more content items associated with the digital magazine, and any combination thereof by:
      determining weights associated with characteristics of page templates based at least in part on characteristics of the identified one or more page templates previously associated with the digital magazine, a weight associated with a characteristic of the page template is based at least in part on one or more characteristics associated with one or more additional page templates associated with the digital magazine and a position of the page template in the digital magazine relative to the identified one or more additional page templates previously associated with the digital magazine, the one or more characteristics associated with the identified one or more page templates are selected from a group consisting of: a number of content items associated with an identified page template, types of content items associated with the identified page template, and any combination thereof;

determining template scores associated with the one or more page templates based at least in part on the weights, a template score associated with a page template based at least in part on weights associated with characteristics of the page template, and selecting the one or more candidate page templates from the one or more page templates based at least in part on the template scores;

generating a score associated with each of the one or more candidate page templates, where a score associated with a candidate page template is based on a number of the content items, characteristics of the one or more content items, and a number of regions in the page template;

selecting a display page template based on the scores associated with the one or more candidate page templates;

generating a section of the digital magazine for presentation via the client device, the section including one or more regions each presenting one or more content items placed in positions specified by the one or more regions of the display page template.

2. The method of claim 1, wherein the weight associated with the characteristic of the page template is based on a number of page templates previously selected to present content from the digital magazine having the characteristic.

3. The method of claim 2, wherein the weight associated with the characteristic of the page template is further based at least in part on a number of page templates selected to subsequently present content from the digital magazine having the characteristic.

4. The method of claim 1, wherein the user interaction with the one or more content items associated with the digital magazine includes a length of time to interact with a content item based at least in part on prior interactions between the user and content items associated with the digital magazine previously presented to the user.

5. The method of claim 4, wherein the length of time to interact with the content item is further based at least in part on one or more attributes of the client device.

6. The method of claim 1, wherein the user interaction with the one or more content items associated with the digital magazine is based at least in part on a frequency with which the user interacted with types of content item and types associated with the retrieved content items.

7. The method of claim 1, wherein the user interaction with one or more content items associated with the digital magazine is based at least in part on content included in the retrieved content items.

8. The method of claim 1, wherein the one or more candidate page templates are selected based at least in part on a location associated with the client device and locations associated with the retrieved content items.

9. A computer program product comprising a non-transitory computer-readable storage medium having instructions encoded thereon that, when executed by a processor, cause the processor to:

store a plurality of page templates, each page template including one or more regions, each region configured to present one or more content items, one or more of the plurality of page templates including one or more regions, each region associated with a height that is based on a width of a display area;

receive a request from a client device to present one or more content items from one or more sources in the digital magazine to a user;

retrieve information describing content items associated with the digital magazine;

retrieve information describing user interaction with one or more content items associated with the digital magazine;

identify one or more page templates previously associated with the digital magazine from the one or more page templates;

select one or more candidate page templates based at least in part on one or more selected from a group consisting of: the identified one or more page templates previously associated with the digital magazine, one or more characteristics of the content items associated with the digital magazine, the user interaction with the one or more content items associated with the digital magazine, and any combination thereof by:

determining weights associated with characteristics of page templates based at least in part on characteristics of the identified one or more page templates previously associated with the digital magazine, a weight associated with a characteristic of the page template is based at least in part on one or more characteristics associated with one or more additional page templates associated with the digital magazine and a position of the page template in the digital magazine relative to the identified one or more additional page templates previously associated with the digital magazine, the one or more characteristics associated with the identified one or more page templates are selected from a group consisting of: a number of content items associated with an identified page template, types of content items associated with the identified page template, and any combination thereof;

determining template scores associated with the one or more page templates based at least in part on the weights, a template score associated with a page template based at least in part on weights associated with characteristics of the page template, and selecting the one or more candidate page templates from the one or more page templates based at least in part on the template scores;

generate a score associated with each of the one or more candidate page templates, where a score associated with a candidate page template is based on a number of the content items, characteristics of the one or more content items, and a number of regions in the page template;

select a display page template based on the scores associated with the one or more candidate page templates;

generate a section of the digital magazine for presentation via the client device, the section including one or more regions each presenting one or more content items placed in positions specified by the one or more regions of the display page template.

10. The computer program product of claim 9, wherein a weight associated with a characteristic of the page template is based on a number of page templates previously selected to present content from the digital magazine having the characteristic.

11. The computer program product of claim 10, wherein the weight associated with the characteristic of the page template is further based at least in part on a number of page templates selected to subsequently present content from the digital magazine having the characteristic.

12. The computer program product of claim 9, wherein the user interaction with the one or more content items associated with the digital magazine includes a length of time to interact with a content item based at least in part on prior interactions between the user and content items associated with the digital magazine previously presented to the user.

13. The computer program product of claim 12, wherein the length of time to interact with the content item is further based at least in part on one or more attributes of the client device.

14. The computer program product of claim 9, wherein the user interaction with the one or more content items associated with the digital magazine is based at least in part on a frequency with which the user interacted with types of content item and types associated with the retrieved content items.

15. The computer program product of claim 9, wherein the user interaction with one or more content items associated with the digital magazine is based at least in part on content included in the retrieved content items.

16. The computer program product of claim 9, wherein the one or more candidate page templates are selected based at least in part on a location associated with the client device and locations associated with the retrieved content items.

\* \* \* \* \*

UNITED STATES PATENT AND TRADEMARK OFFICE
CERTIFICATE OF CORRECTION

PATENT NO. : 9,830,310 B2
APPLICATION NO. : 15/474093
DATED : November 28, 2017
INVENTOR(S) : Charles Hugo Ying Page 1 of 1

It is certified that error appears in the above-identified patent and that said Letters Patent is hereby corrected as shown below:

In the Claims

Column 27, Line 45, Claim 6, delete "content item" and insert --content items--

Signed and Sealed this
Twelfth Day of November, 2019

Andrei Iancu
*Director of the United States Patent and Trademark Office*